(12) United States Patent
Mandal (10) Patent No.: US 9,596,279 B2
(45) Date of Patent: Mar. 14, 2017

(54) CLOUD-BASED STREAMING DATA RECEIVER AND PERSISTER

(71) Applicant: DELL PRODUCTS L.P., Round Rock, TX (US)

(72) Inventor: Kaniska Mandal, Sunnyvale, CA (US)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 13/763,520

(22) Filed: Feb. 8, 2013

(65) Prior Publication Data

US 2014/0229628 A1 Aug. 14, 2014

(51) Int. Cl.
G06F 15/16 (2006.01)
H04L 29/06 (2006.01)
H04L 29/08 (2006.01)
G06F 17/30 (2006.01)

(52) U.S. Cl.
CPC .......... *H04L 65/60* (2013.01); *H04L 67/2804* (2013.01); *H04L 67/2852* (2013.01); *G06F 17/30525* (2013.01)

(58) Field of Classification Search
CPC . H04L 65/60; H04L 67/2804; H04L 67/2852; G06F 17/30525
USPC ........................................................ 709/231
See application file for complete search history.

(56) References Cited

U.S. PATENT DOCUMENTS

| | | |
|---|---|---|
| 5,325,519 A | 6/1994 | Long et al. |
| 5,729,743 A | 3/1998 | Squibb |
| 6,035,298 A | 3/2000 | McKearney |
| 6,092,083 A | 7/2000 | Brodersen et al. |
| 6,212,524 B1 | 4/2001 | Weissman et al. |
| 6,321,374 B1 | 11/2001 | Choy |
| 6,367,077 B1 | 4/2002 | Brodersen et al. |
| 6,405,219 B2 | 6/2002 | Saether et al. |
| 6,493,744 B1 * | 12/2002 | Emens ................ H04L 67/2819 386/262 |
| 6,573,907 B1 * | 6/2003 | Madrane ........... G06F 17/30787 707/E17.028 |
| 6,631,374 B1 | 10/2003 | Klein et al. |
| 6,711,593 B1 | 3/2004 | Gordon et al. |

(Continued)

FOREIGN PATENT DOCUMENTS

| | | |
|---|---|---|
| EP | 2 837 158 | 2/2015 |
| WO | WO 00/68841 | 11/2000 |

(Continued)

OTHER PUBLICATIONS

Casati, Frank, et al., "A Generic solution for Warehousing Business Process Data", VLDB '07, Vienna, Austria, Sep. 23-28, 2007. pp. 1128-1137.

(Continued)

*Primary Examiner* — Ario Etienne
*Assistant Examiner* — Andrea Hurst
(74) *Attorney, Agent, or Firm* — Polsinelli LLP (57) ABSTRACT

The present system receives streaming raw data and inserts context into the raw data. The context raw data may be partitioned into sub-batches and transmitted to a data receiver and persister. The raw data may include context information as well as child-parent information to assist with persisting data. The context may be used to place the data in buckets without analysis of the data, thereby saving time and resources while storing the data batches.

21 Claims, 6 Drawing Sheets

(56) References Cited

U.S. PATENT DOCUMENTS

| | | | |
|---|---|---|---|
| 6,721,765 B2 | 4/2004 | Ghosh et al. | |
| 6,721,767 B2 | 4/2004 | De Meno et al. | |
| 6,732,095 B1 | 5/2004 | Warshavsky et al. | |
| 6,775,681 B1 | 8/2004 | Ballamkonda et al. | |
| 7,076,496 B1 | 7/2006 | Ruizandrade | |
| 7,191,183 B1 | 3/2007 | Goldstein | |
| 7,225,249 B1 | 5/2007 | Barry et al. | |
| 7,249,118 B2 | 7/2007 | Sandler et al. | |
| 7,290,166 B2 | 10/2007 | Rothman et al. | |
| 7,487,173 B2 | 2/2009 | Medicke et al. | |
| 7,546,312 B1 | 6/2009 | Xu et al. | |
| 7,640,264 B1 | 12/2009 | Chaulk et al. | |
| 7,657,887 B2 | 2/2010 | Kothandaraman et al. | |
| 7,752,172 B2 | 7/2010 | Boylan et al. | |
| 7,779,039 B2 | 8/2010 | Weissman et al. | |
| 7,827,350 B1 | 11/2010 | Jiang et al. | |
| 7,895,474 B2 | 2/2011 | Collins et al. | |
| 8,161,010 B2 | 4/2012 | Weissman et al. | |
| 8,200,628 B2 | 6/2012 | An et al. | |
| 8,335,264 B2* | 12/2012 | Suzumura | 375/240.25 |
| 8,423,524 B1 | 4/2013 | Rana et al. | |
| 8,825,593 B2 | 9/2014 | Dodds et al. | |
| 8,832,651 B2 | 9/2014 | Kibbar | |
| 8,874,508 B1 | 10/2014 | Mittal | |
| 8,972,405 B1 | 3/2015 | Chaulk et al. | |
| 9,191,432 B2 | 11/2015 | Bengali | |
| 9,442,993 B2 | 9/2016 | Tung | |
| 9,531,790 B2 | 12/2016 | Bengali | |
| 2003/0046422 A1* | 3/2003 | Narayanan | G06F 9/465 709/238 |
| 2004/0039879 A1* | 2/2004 | Gaither | 711/145 |
| 2004/0078516 A1 | 4/2004 | Henderson et al. | |
| 2004/0236786 A1 | 11/2004 | Medicke et al. | |
| 2004/0254964 A1 | 12/2004 | Kodama et al. | |
| 2006/0047780 A1 | 3/2006 | Patnude | |
| 2007/0250480 A1 | 10/2007 | Najork | |
| 2007/0282806 A1* | 12/2007 | Hoffman | G06F 17/30067 |
| 2008/0077613 A1* | 3/2008 | Hay et al. | 707/103 R |
| 2008/0120618 A1 | 5/2008 | Collins et al. | |
| 2008/0276239 A1 | 11/2008 | Collins et al. | |
| 2008/0281918 A1 | 11/2008 | Kirkwood | |
| 2008/0285738 A1* | 11/2008 | Misra et al. | 379/265.09 |
| 2008/0285755 A1 | 11/2008 | Camus et al. | |
| 2009/0024915 A1 | 1/2009 | Cudich et al. | |
| 2009/0049288 A1 | 2/2009 | Weissman | |
| 2009/0055439 A1 | 2/2009 | Pai et al. | |
| 2009/0063557 A1 | 3/2009 | Macpherson | |
| 2009/0064147 A1 | 3/2009 | Beckerle et al. | |
| 2009/0171927 A1* | 7/2009 | Nesamoney et al. | 707/4 |
| 2009/0279613 A1* | 11/2009 | Suzumura | 375/240.25 |
| 2009/0285067 A1 | 11/2009 | Chen et al. | |
| 2009/0299987 A1 | 12/2009 | Willson | |
| 2009/0313436 A1 | 12/2009 | Krishnaprasad et al. | |
| 2009/0327311 A1 | 12/2009 | Becker | |
| 2010/0005013 A1 | 1/2010 | Uriarte | |
| 2010/0005055 A1 | 1/2010 | An et al. | |
| 2010/0087935 A1 | 4/2010 | Pettus et al. | |
| 2010/0138615 A1* | 6/2010 | Klaiber et al. | 711/146 |
| 2010/0211548 A1 | 8/2010 | Ott et al. | |
| 2010/0229082 A1 | 9/2010 | Karmarkar et al. | |
| 2011/0072212 A1* | 3/2011 | Kojima | 711/119 |
| 2011/0125705 A1 | 5/2011 | Aski et al. | |
| 2011/0126168 A1 | 5/2011 | Ilyayev | |
| 2011/0145499 A1* | 6/2011 | Ananthanarayanan et al. | 711/118 |
| 2011/0161946 A1 | 6/2011 | Thomson et al. | |
| 2011/0246449 A1 | 10/2011 | Collins et al. | |
| 2011/0258178 A1 | 10/2011 | Eidson et al. | |
| 2011/0302583 A1* | 12/2011 | Abadi | G06F 17/30545 718/102 |
| 2012/0005153 A1 | 1/2012 | Ledwich et al. | |
| 2012/0023109 A1 | 1/2012 | Sternemann et al. | |
| 2012/0110566 A1 | 5/2012 | Park | |
| 2012/0150791 A1 | 6/2012 | Willson | |
| 2012/0221608 A1 | 8/2012 | An et al. | |
| 2012/0246118 A1 | 9/2012 | Feng et al. | |
| 2012/0254111 A1 | 10/2012 | Carmichael | |
| 2012/0259852 A1* | 10/2012 | Aasen et al. | 707/737 |
| 2012/0259894 A1* | 10/2012 | Varley | G06F 17/30575 707/795 |
| 2013/0018904 A1 | 1/2013 | Mankala et al. | |
| 2013/0019235 A1 | 1/2013 | Tamm | |
| 2013/0055232 A1 | 2/2013 | Rajan et al. | |
| 2013/0073513 A1 | 3/2013 | Kemper et al. | |
| 2013/0073573 A1* | 3/2013 | Huang | G06F 17/30563 707/755 |
| 2013/0080413 A1* | 3/2013 | Chen | G06F 17/30584 707/706 |
| 2013/0212042 A1* | 8/2013 | Rosenberg | G06Q 40/06 705/36 R |
| 2013/0238641 A1 | 9/2013 | Mandelstein et al. | |
| 2013/0275612 A1* | 10/2013 | Voss | H04L 65/60 709/231 |
| 2014/0006580 A1 | 1/2014 | Raghu | |
| 2014/0006581 A1 | 1/2014 | Raghu | |
| 2014/0013315 A1 | 1/2014 | Genevski et al. | |
| 2014/0019488 A1 | 1/2014 | Wo et al. | |
| 2014/0074771 A1 | 3/2014 | He et al. | |
| 2014/0149494 A1 | 5/2014 | Markley et al. | |
| 2014/0149591 A1 | 5/2014 | Bhattacharya et al. | |
| 2014/0156806 A1* | 6/2014 | Karpistsenko | H04N 21/00 709/219 |
| 2014/0172775 A1 | 6/2014 | Niehoff et al. | |
| 2014/0223100 A1 | 8/2014 | Chen | |
| 2014/0229423 A1 | 8/2014 | Bengali | |
| 2014/0229511 A1 | 8/2014 | Tung | |
| 2014/0229577 A1 | 8/2014 | Bengali | |
| 2014/0359771 A1* | 12/2014 | Dash | H04L 63/1408 726/23 |
| 2016/0065651 A1 | 3/2016 | Bengali | |
| 2016/0085794 A1 | 3/2016 | Bengali | |
| 2017/0004187 A1 | 1/2017 | Tung | |

FOREIGN PATENT DOCUMENTS

| | | |
|---|---|---|
| WO | WO 2014/123564 | 8/2014 |
| WO | WO 2014/123565 | 8/2014 |

OTHER PUBLICATIONS

U.S. Appl. No. 13/764,173; Office Action mailed Jan. 27, 2015.

U.S. Appl. No. 13/764,446; Office Action mailed Feb. 2, 2015.

Curino, Carlo, et al., "Automating Database Schema Evolution in Information System Upgrades", HotSWUp '09, Orlando, FL, Oct. 25, 2009, 5 pages.

Jun, Yang, "A Modern Service Oriented Unit-Based Distributed Storage Model for Peer Nodes", IC-BNMT 2009, Beijing, China, Oct. 18-20, 2009, pp. 659-663.

Nadkami, Parkash M., "Metadata for Data Warehousing", Meta-Driven Software Systems in Biomedicine, Health Informatics 2011, Apr. 29, 2011, pp. 359-372.

Park, Kyounghyun, et al., "SaaSpia Platform: Integrating and Customizing On-Demand Applications Supporting Multi-tenancy", ICACT 2012, PyeongChang, Korea, Feb. 19-22, 2012, pp. 961-964.

U.S. Appl. No. 13/764,384; Office Action mailed May 7, 2015.

Google Scholar, "Streaming data cloud metadata" Date of download: Nov. 3, 2014 http://scholar.googl.com/scholar?=streaming+data+cloud+metadata&btnG=&hl=en&as_sdt=0%C47.

U.S. Appl. No. 13/762,028; Office Action mailed Oct. 30, 2014.

Aulbach, Stefan, et al., "A comparison of Flexible Schemas for Software as a Service", SIGMOD '09, Providence, RI, Jun. 29-Jul. 2, 2009, pp. 881-888.

Aulbach, Stefan, et al., "Multi-Tenant Databases for Software as a Service: Schema-Mapping Techniques", SIGMOD '08, Vancouver, BC, Canada, Jun. 9-12, 2008, pp. 1195-1206.

Bobrowski, Steve, "Optimal Multi-tenant Designs for Cloud Apps", Cloud 2011, Washington, DC, Jul. 4-9, 2011, pp. 654-659.

Chaudhuri, Surajit, et al., "An Overview of Business Intelligence Technology", Communications of the ACM, vol. 54, No. 8, Aug. 2011, pp. 88-98.

(56) References Cited

OTHER PUBLICATIONS

Chong, Frederick, et al., "Multi-Tenant Data Architecture", Microsoft Corp., Jun. 2006, pp. 1-15.
Domingo, Enrique Jimenez, et al., "CLOUDIO: A Cloud Computing-oriented Multi-Tenant Architecture for Business Information Systems", 2010 IEEE 3rd Intl Conf. on Cloud Computing, IEEE Computer Society, © 2010, pp. 532-533.
Gao, Bo, et al., "A Non-Intrusive Multi-tenant Database for Large Scale SaaS Applications", ICEBE 2011, Beijing, China, Oct. 19-21, 2011, pp. 324-328.
Grund, Martin, et al., "Shared Table Access Pattern Analysis for Multi-Tenant Applications", AMIGE 2008, Tianjin, China, 2008, pp. 1-5.
Hill, Phil, "Clarification on Cloud, SaaS and Multi-tenant Language", e-Literate, Sep. 10, 2012, pp. 1-7.
Kwok, Thomas, et al., "A Software as a Service with Multi-Tenancy Support for an Electronic Contract Management Application", 2008 IEEE Intl Conf. on Service Computing, IEEE Computer Society, © 2008, pp. 179-186.
Momm, Christof, et al., "A Qualitative Discussion of Different Approaches for Implementing Multi-Tenant SaaS Offerings", Software Engineering (Workshops), vol. 11, © 2011, pp. 139-150.
"Multi-tenancy", WhatIs.com, Apr. 5, 2011, 1 page.
"Multitenancy", Wikipedia, downloaded from: en.wikipedia.org/wiki/Multi-tenant on Oct. 3, 2014, pp. 1-5.
Schaffner, Jan. et al., "Towards Analytics-as-a-Service Using an in-Memory Column Database", Information and Software as Services, LNBIP 74, Springer-Verlag, Berlin, Germany, © 2011, pp. 257-282.
"Schema", Microsoft Computer Dictionary, 5th Edition, Microsoft Press, Redmond, WA, © 2002, p. 465.
"Software as a service", Wikipedia, downloaded Aug. 2, 2014, pp. 1-10.
Tsai, Wei-Tek, et al., "Towards a Scalable and Robust Multi-Tenancy SaaS", Internetware 2010, Suzhou, China, Nov. 3-4, 2010, Article No. 8, pp. 1-15.
Weissman, Craid D., et al., "The Design of the Force.com Multitenant Internet Application Development Platform", SIGMOD Providence, RI, Jun. 29-Jul. 2, 2009, pp. 889-896.
Xue, Wang, et al., "Multiple Sparse Tables Based on Pivot Table for Multi-Tenant Data Storage in SaaS", Proc. of the IEEE Int'l Conf. on Information and Automation, Shenzhen, China, Jun. 2011, pp. 634-637.
Xuxu, Zheng, et al., "A Data Storage Architecture Supporting Multi-Level Customization for SaaS", WISA 2010, Hothot, China, Aug. 20-22, 2010, pp. 106-109.
Yaish, Haitham, et al., "An Elastic Multi-tenant Database Schema for Softare as a Service", DASC 2011, Sydney, NSW, Australia, Dec. 12-14, 2011, pp. 737-743.
PCT Application No. PCT/US2013/046280 International Search Report and Written Opinion mailed Dec. 6, 2013.
U.S. Appl. No. 13/764,384; Final Office Action mailed Oct. 9, 2014.
U.S. Appl. No. 13/764,384; Office Action mailed Aug. 14, 2014.
U.S. Appl. No. 13/764,446; Office Action mailed Sep. 11, 2014.
PCT Application No. PCT/US2013/046277 International Search Report and Written Opinion mailed Jan. 7, 2014.
U.S. Appl. No. 13/762,028; Final Office Action mailed May 21, 2015.
European Patent Application No. 13874570.8 Extended EP Search Report dated Jul. 27, 2016.
Liu, Hui, et al.; "Data Storage Schema Upgrade via Metadata Evolution in Seas", CECNet 2012, Yichang, China, Apr. 21-23, 2012, pp. 3148-3151.
U.S. Appl. No. 13/762,028; Final Office Action mailed Sep. 1, 2016.
U.S. Appl. No. 13/762,028; Office Action mailed Mar. 31, 2016.
U.S. Appl. No. 14/936,503; Office Action mailed Apr. 21, 2016.
U.S. Appl. No. 14/936,503, Ketan Bengali, SAAS Network—Based Backup System, filed Nov. 9, 2015.
U.S. Appl. No. 14/862,007, Ketan Bengali, Data Consistency and Rollback for Cloud Analytics, filed Sep. 22, 2015.
U.S. Appl. No. 15/263,884, David Tung, Metadata Manager for Analytics System, filed Oct. 27, 2016.
Brandt, Cynthia A., et al.; "Meta-driven creation of data marts from EAV-Modeled clinical research database", International Journal of Medical Informatics, vol. 65, Issue 3, Nov. 12, 2002. pp. 225-241.
Han, Jung-Soo, et al.; "Integration Technology of Literature Contents based on SaaS", ICISA 2011, Jeju Island, Korea, Apr. 26-29, 2011, pp. 1-5.
U.S. Appl. No. 13/764,384; Final Office Action mailed Oct. 8, 2015.
European Patent Application No. 13874789.4 Extended EP Search Report dated Sep. 15, 2016.
U.S. Appl. No. 15/391,646, Ketan Bengali, SAAS Network-Based Backup System, filed Dec. 27, 2016.
Lomet, David, et al.; "Unbundling Transaction Services in the Cloud", CIDR Perspectives 2009, Asilomar, CA, Jan. 4-7, 2009, 10 pages.

\* cited by examiner

CLOUD-BASED STREAMING DATA RECEIVER AND PERSISTER

BACKGROUND

Businesses must process large amounts of data to make decisions and be successful. The data is often provided in formats such as reports. To build a meaningful report, businesses are relying on multi-tenanted SAAS analytic companies. Building and providing meaningful analytics typically requires a large amount of resources and has a high cost.

Building the reports typically requires acquiring data, transforming the data to a meaningful format, and performing analytics of the meaningful data to generate the report. Data storage, transformation and manipulation require data schemas to store the data, transform the data and process the data. These tasks are typically performed manually by administrators. Currently, there is no cloud-based solution that connects data sources and continually feeds a data receiver with data other than raw data.

SUMMARY

The present system receives streaming raw data and inserts context into the raw data. The context raw data may be partitioned into sub-batches and transmitted to a data receiver and persister. The raw data may include context information as well as child-parent information to assist with persisting data. The context may be used to place the data in buckets without analysis of the data, thereby saving time and resources while storing the data batches.

In an embodiment, a method for streaming data may be with receiving raw streaming data from a plurality of applications. Context data may be associated with a batch of the raw data. The batch of raw data and corresponding context data may then be transmitted to a remote server.

In an embodiment, a system for communicating navigation data may include a memory, a processor, and one or more modules stored in memory and executable by the processor. The modules may be executed to receive raw streaming data from a plurality of applications, associate context data to a batch of the raw data, and transmit the batch of raw data and corresponding context data to a remote server.

DETAILED DESCRIPTION

The present system receives streaming raw data and inserts context into the raw data. The context raw data may be partitioned into sub-batches and transmitted to a data receiver and persister. The raw data may include context information as well as child-parent information to assist with persisting data. The context may be used to place the data in buckets without analysis of the data, thereby saving time and resources while storing the data batches.

The batches may be tenant specific, application specific, and grouped into context aware sub-groups for parallel processing. The context is stored in a record and processed with the batch, so applications processing the data do not need any intelligence regarding the batch data. The context allows for quick, stateless processing and complete data isolation for multiple applications and multiple tenants.

The context also provides for parallel persistence of groups of records. The present system does not need to process the data to figure out how to store the data (e.g., how to bucket the data). Rather, the context is stored in record format, for example within a table, and contains schema metadata having context data and parent-child data for the batch data. There is no dynamic mapping of a record to a schema. The target schema may be resolved based on tenant information and application information, and may be resolved dynamically on the fly. Hence, if record A and record B arrive at the same time from tenant A and tenant B, the system will dynamically resolve the data source for the records based on the tenant and application info. Record A can be persisted in a Hadoop/HBase data store whereas record B can be stored into MySQL. Thus, the present system is not only schema-agnostic but supports polygot persistence through dynamic data source resolution.

One or more embodiments may utilize all or part of a process as follows. A data-flow initiation message may be received from a data provider/connector, such as a cloud-based data integrator. Upon receiving the initiation message, the system may build a context (TenantInfo, AppInfo, TimingInfo, BatchInfo etc.) and send back the context info to the data provider which then inserts context into the raw data, thus making the data intelligent. The context-aware raw data may be partitioned into sub-batches and transmitted in parallel to a data receiver and persister. The raw data may include additional context information as well as child-parent information to assist with persisting data. In some embodiments, the present system can automatically discover and create schema based on the streaming data. The context may be used to place the data in buckets without analysis of the data, thereby saving time and resources while storing the data batches. By virtue of the contextual info, the data may be automatically shared by parameters such as tenant information, application information, batch information and timing information thereby saving persistence overheads. In some embodiments, the present system may be completely stateless and may not know what source is sending what data as well as when and how data-sets are related, and where the data is stored.

In embodiments, data may include information to indicate a tenant, application, location and relationship associated with the data. In this context, the data may be tenant-aware, application-aware, location-aware, and relationship-aware. In some embodiments, at some stage of data flow or in the event of a failure (1>flow initiation, 2>send data 3>flow termination) an integration server may send a flow termination signal (Success/Failure) so that the present system can update the status of the context for the specific batch, application and tenant. The fact that the history of context information may be stored into a separate metadata store may provide that any failed integration process upon restart will reuse the context information of the last successful batch and will fetch the data from the correct time-window. The contextual information also contains a sliding time-window such that any past batch within a time-window can be replayed in the future for data recovery from a source or target persistence store. Independent probing of contextual metadata may allow proactive error-discovery, data-usage discovery, elastic storage increase, automatic ramp-up of processing bandwidth without affecting the main streaming data collection and persistence flow. Automatic storage provision and schema discovery based on contextual info may automatically route or reroute incoming data-streams to a data store.

The scalable, non-invasive protocol-based technology can be implemented to take care of many types of business scenarios. These scenarios include integrating with disparate business applications, instant business analytics and visualization, mash up data from heterogeneous sources, real-time business alerts, business decision making and predictive analysis, cloud-based business data backup and restoration, an managing the warehouse for disparate business data by leveraging features of the present technology. The leveraged features may include contextual intelligence (injected into data), complete data isolation, data sharing, data scalability, contextual rollback, contextual backup, ordering, auto-restartability, data-replay (time-machine), pro-active error-recovery, contextual view (app-specific/tenant-specific/batch-specific/time-rang specific), contextual analysis (data consumption pattern for tenants/apps/objects), and automatic schema generation.

Figure 1:
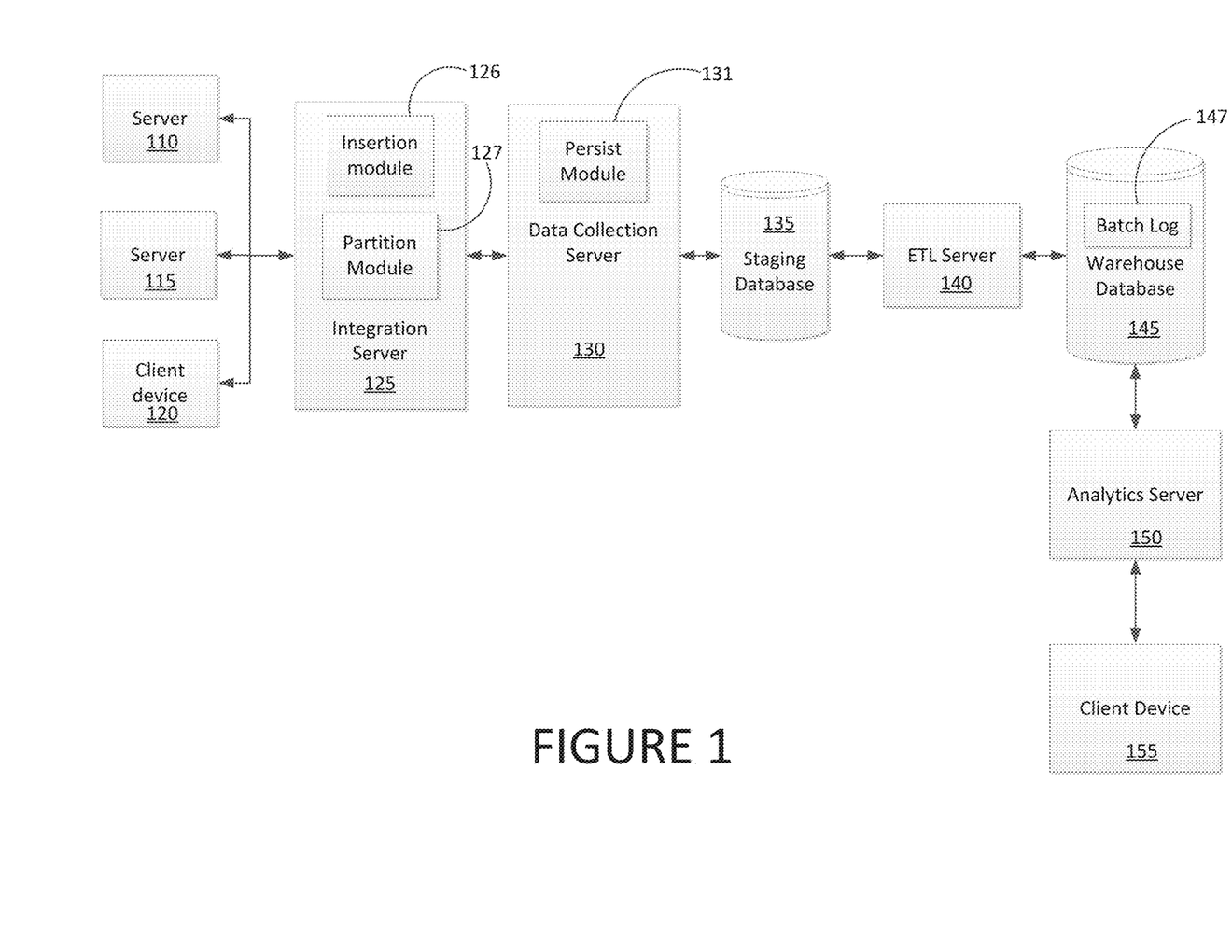
FIG. 1 is a block diagram of an exemplary data streaming system.

FIG. 1 is a block diagram of an exemplary data streaming system. The system of FIG. 1 includes tenant servers 110 and 115, tenant client 120, integration server 125, data collection server (DCS) 130, staging database 135, extract-transform-load (ETL) server 140, warehouse database 145, analytics server 150 and client device 155. Each of devices 110-155 may communicate with each other over a network (not shown). The network may be implemented as a private network, public network, Wi-Fi network, WAN, LAN, an intranet, the Internet, a cellular network, or a combination of these networks.

Servers 110 and 115 and client device 120 may each be associated with a tenant (client organization) in a multi-tenancy. Each tenant of the multi-tenancy may include one or more servers and client devices. Each server and client may include data to be collected by data collection server 130 via integration server 125. Client device 120 may be implemented as a desktop, laptop, notebook, tablet computer, smart phone, or some other computing device.

In some embodiments, the present technology is served seamlessly from a "cloud" (e.g., resources provided from over a network) from a single access point, such as a multi-tenant SaaS cloud website, and the entire flow can be experienced from any type of client device. This unique approach saves multiple types of infrastructural costs for different types of software and hardware to implement data integration, data collection and persistence, data analysis and visualization.

In embodiments, integration server 125 may communicate with different SAAS providers, whether provided from a cloud or a particular machine, and communicate with data collection server 130. Integration server may include one or more modules for implement aspects of the present technology. Insertion module 126 may insert context data and child-parent associated with a data batch into a table. The context data may include information such as application ID, batch ID, tenant ID, and may include a sliding window of time, such as a time range, for which to fetch data. The batch data which includes context may become application aware, tenant aware, and context aware. The insertion module may also insert parent and child information, such as whether the current batch, batch sub-set or record is a child or parent of another batch, sub-set or record. When data includes the parent-child data, it becomes persistence ready. Integration server 125 may send stateless data in batch subsets in parallel to data collection server 130.

Data collection server 130 may collect data from one or more tenant applications on devices 110-120 through integration server 125 and store the data in a staging database 135. The Data collection server may send batch instructions to integration server 125 in response to receiving a start batch request. The instructions may include the context information to be inserted into the data table for one or more batches. Once the batch subset data is received, the data may be persisted persist module 131 on data collection server 130. The data collection server may act as a streaming data receiver and persister (SDRP).

Data collection server may provide any portion of the staging data to ETL server 140, for example upon receiving a data request from ETL server 140. When data is collected, it is stored and maintained. Batches of data are not overwritten with newly collected data.

Though modules 126-127 and 131 are discussed herein, additional modules may be used to implement the functionality described herein. Modules 126-127 and 131 are intended to be merely exemplary of the many executable modules which may be implemented.

ETL server 140 receives staging data from data collection server 130 and may transform the data to a format more useful to a user. For example, the data transformation may include selecting only certain columns to load into a star format, translating coded values, deriving new calculated values, sorting data, aggregating data, transposing or pivoting data, splitting a column into multiple columns, and other processing. Once data is transformed by ETL server 140, it may be provided to data warehouse 145 for future analytics.

It should be understood that the current approach is not limited to traditional staging-ETL-warehouse approach. This is just one example of the implementation of the present technology. Features like ability to receive contextual data from multiple sources in parallel and stateless mode allows the system to store unstructured and structured data in disparate systems (dynamically creating schema on-the fly) so that an analytical module can explore co-located columnar/key-value records or heavily indexed/compressed files quickly and allow users to mash-up records from various sources, create KPI, perform analytical functions and perform ad-hoc query.

Warehouse database 145 may receive transformed data from ETL server 140 and provide the data to analytics server 150 for processing. When data is loaded into warehouse database 145, the data is stored in a star schema and maintained. Transformed data is not overwritten in warehouse database 145. This allows rollback to previous batches of data if needed. A batch log 147 may be stored at warehouse database 145. The batch log may be updated and maintained to track information about each batch of data and may be used in the rollback of data. The batch log may be stored in table format and may include attributes for each batch such as batch ID, tenant ID, data start date and time, data end date and time, DCS processing status, staging database ID, ETL processing status, and ETL server ID. The DCS processing status and ETL processing status may include not started, in-progress, success and failure. The batch log may be updated by ETL server 140, data collection server 130, and other servers of the system of FIG. 1. Though illustrated as being stored in warehouse database 145, batch log 147 may be stored on another serer or database within the system of FIG. 1.

Analytics server 150 may retrieve transformed data stored in a star schema in data warehouse 145 and perform analytics to the data. The results of the analytics may be provided in the form of charts, graphs, reports or other formats to a user at client device 155.

Though illustrated as one server or one device, each of the servers and clients of the system of FIG. 1 may be implemented using one or more actual or logical machines, servers and client devices. One or more blocks of the system of FIG. 1 may also be combined. Further, though examples of communications are shown using arrows, it is intended and should be understood that each of the servers and clients in the system of FIG. 1 may communicate over network, and therefore with each other.

Figure 2:
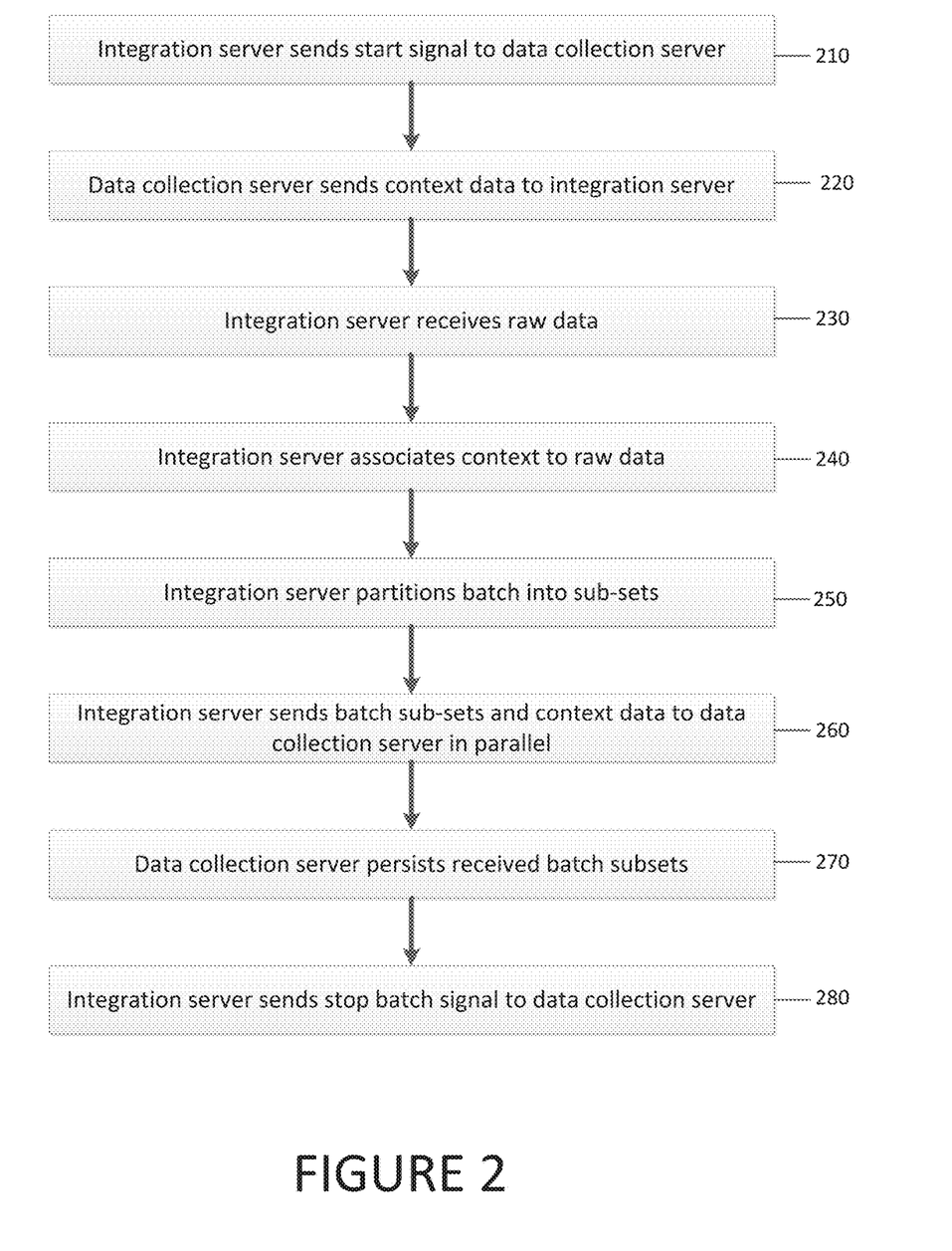
FIG. 2 is exemplary method for receiving and persisting data.

FIG. 2 is exemplary method for receiving and persisting data. Integration server 125 sends a start signal to the data collection server 130 at step 210. The start signal indicates that data will be collected and sent to the data collection server. The data collection server 130 sends context data to integration server 125 at step 220. The context may be semantic context information including application ID (application from which the streaming data is received), batch ID (the batch associated with the streaming data), a tenant ID (the tenant providing the streaming data), and a time range associated with the collected streaming data.

The integration server receives the raw data at step 230. The raw data may be received from one or more tenants in a multi-tenancy system. Integration server 125 then associates the context to the raw data at step 240. Associating the context to the raw data may include creating and updating a table with context data. Associating context to raw data is discussed in more detail below with respect to FIG. 3. A batch of data is partitioned into sub-sets by integration server 125 at step 250. The streaming data is stateless, and need not be in any particular order. Therefore, the partitions of the batch may be in any order and size.

Integration server 125 sends the batch sub-sets and context data to data collection server 130 in parallel streams at step 260. The data is received and persisted by data collection server 130 at step 270. The batch data may be persisted on many levels. Persisting batch data is discussed in more detail below with respect to the method of FIG. 4. Integration server 125 sends a stop batch signal to data collection server 130. This signals the end of the data collection for the current batch.

Figure 3:
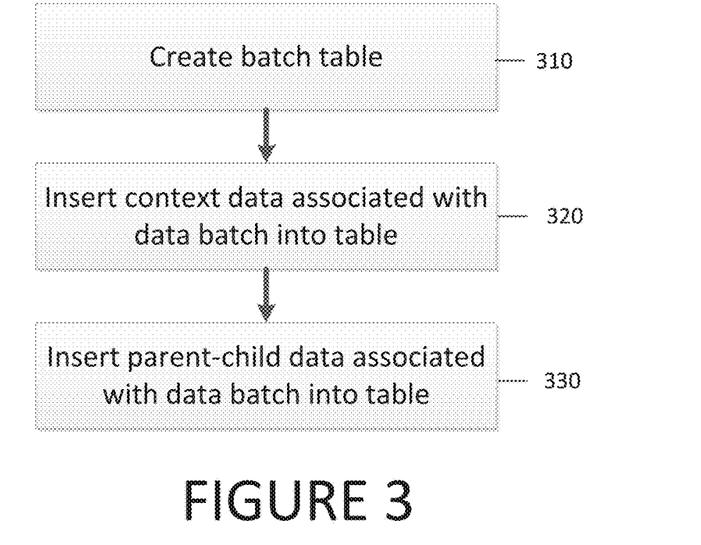
FIG. 3 is an exemplary method for associating context with raw data.

FIG. 3 is an exemplary method for associating context with raw data. A batch table is created at step 310. The batch table may be created per batch or for a group of batches. Context data associated with the batch may be inserted into the table at step 320. By inserting context data into the batch table, for example using a metadata schema, the application code is not polluted or altered with extra logic required to manage a lifecycle of a batch of records. Parent-child data associated with the data batch is inserted into the table at step 330. The parent-child data allows for data persisting at data collection server 130.

Figure 4:
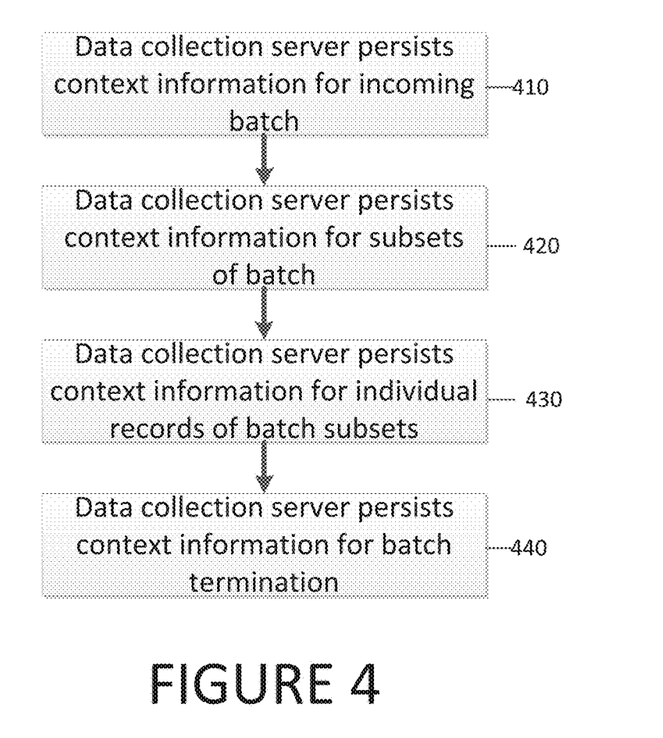
FIG. 4 is an exemplary method for persisting data.

FIG. 4 is an exemplary method for persisting data. The data collection server 130 persists context information for the incoming batch at step 410. The persisting may be performed for batch ID, tenant ID, application ID, state of the batch, the data source, and other information. Context information for subsets of the batch is then persisted at step 420. The persisting for batch subsets may involve group ID, batch ID, tenant ID, application ID, target entity and schema. Context information for individual records of batch sub-sets is persisted at step 430. Record level persistence may include automatic schema resolution and dynamic data source discovery. Data collection server 130 may persist context information for batch termination at step 440. Batch termination data persistence completes the life cycle of the batch records. The Context is elastic in nature meaning any number of metadata can be added, for example application-category identification, application-identification, geographical location identification, and so on etc.

Figure 5:
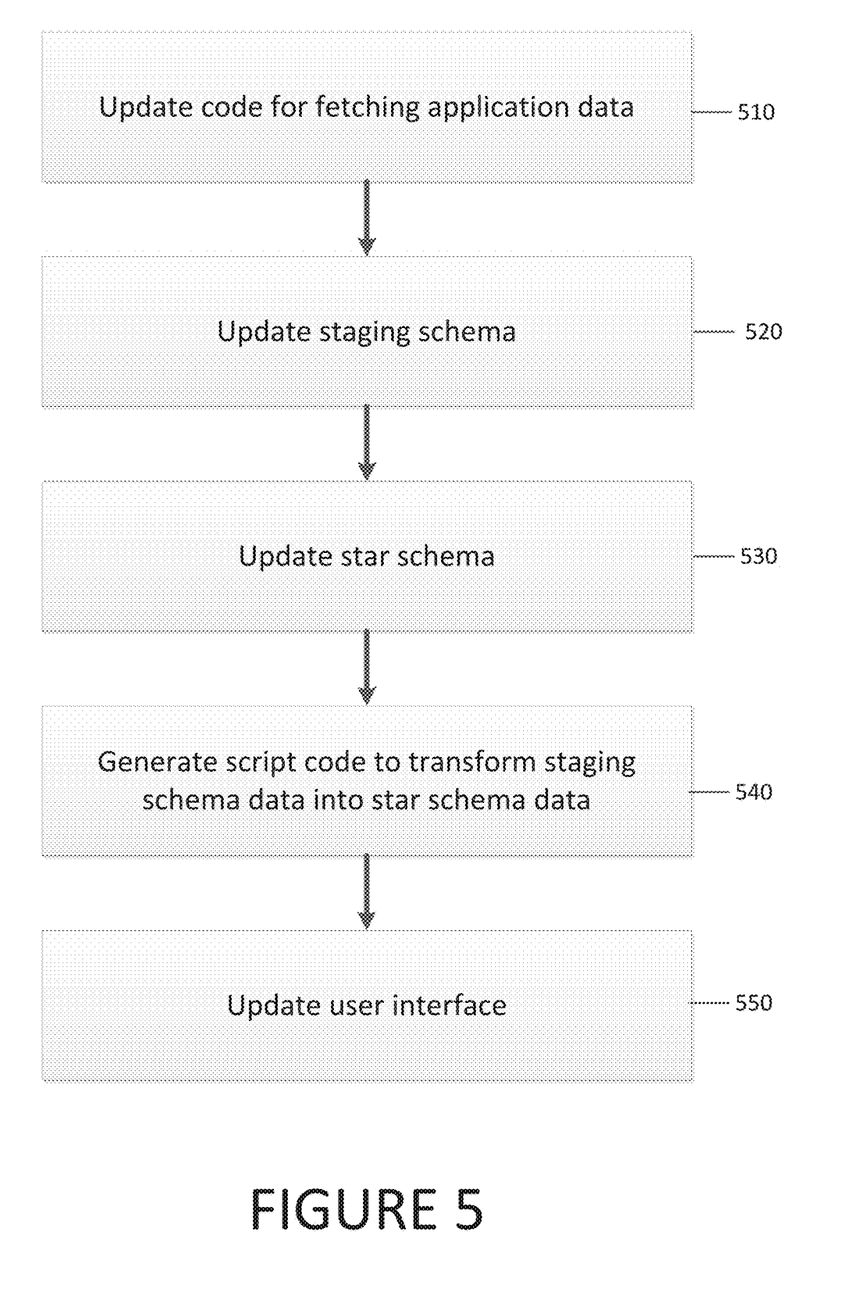
FIG. 5 is an exemplary method for automatically updating a data mapping architecture.

FIG. 5 is an exemplary method for automatically updating a data mapping architecture. The method of FIG. 5 may provide more detail for step 320 of the method of FIG. 3. Code for fetching application data is updated at step 510. The code may be updated to reflect new fields of data to collect or other information based on changes to the data mapping process. The updated code may be generated by a mapping manager application (not shown) and provided to data collection server 130. Staging schema may be updated at step 520. The staging schema may be updated by the mapping manager application and provided to staging data store 135.

The star schema may be updated at step 530. The star schema may be updated to reflect changes received from a user. Once generated, the star schema can be provided to data warehouse 145 by mapping data manager. Script code can be generated to transform data in staging schema to star schema at step 540. The transforming script may be generated at least in part from column mapping data and provided to ETL server 140 for transforming data. A user interface is updated at step 550. The user interface may be updated to allow users to modify up-to-date schema information and script code, generate reports from the latest schemas, and other functions. User interfaces may be provided through a web browser or other application.

Figure 6:
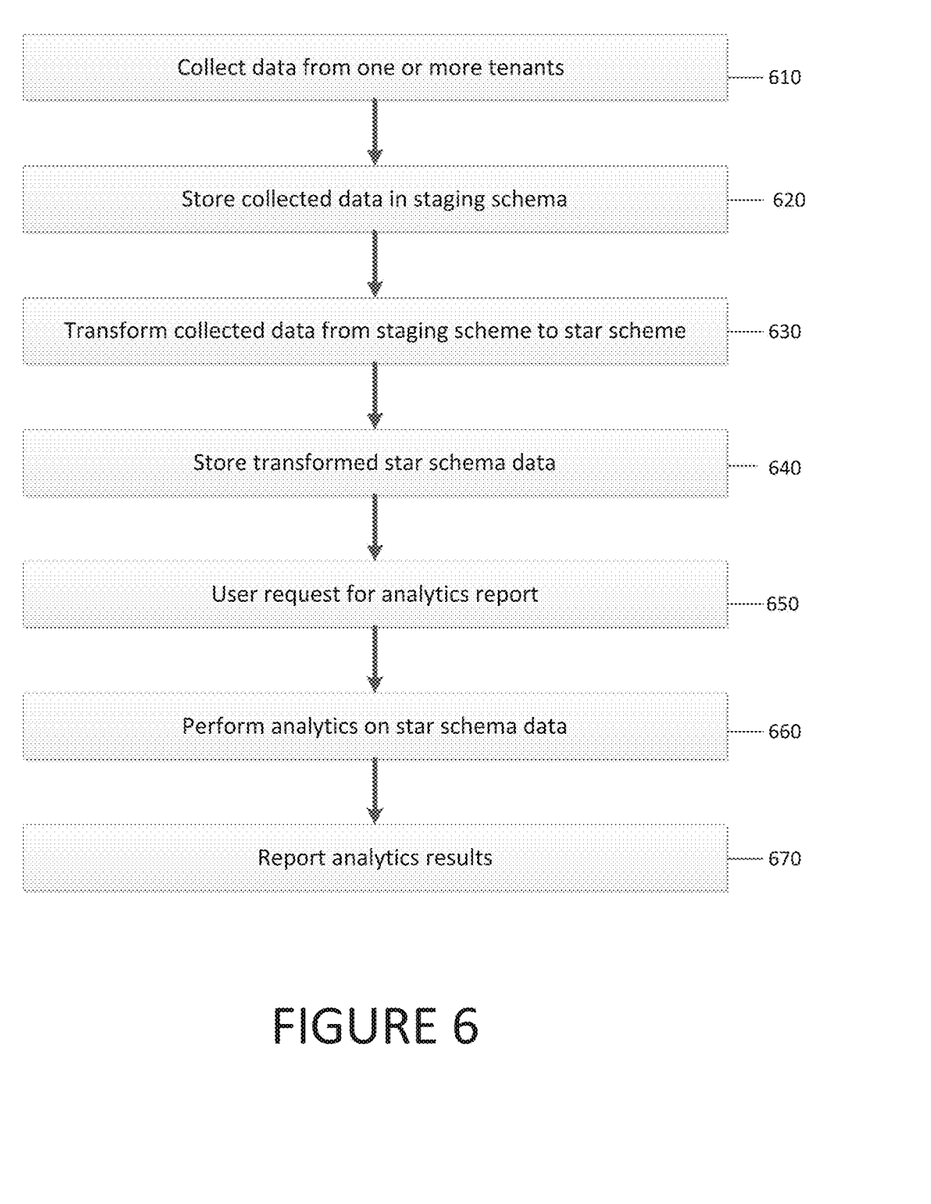
FIG. 6 is an exemplary method for mapping data.

FIG. 6 is an exemplary method for mapping data. The method of FIG. 6 may provide more detail for step 330 of the method of FIG. 3. Data is collected from one or more applications for one or more tenants at step 610. The data collection can be performed by data collection server 130 according to data collection scripts or code provided by mapping manager application. Collected data may then be stored in staging schema at step 620. The staging schema may be provided by mapping manager application. Collected data is then transformed from a staging schema to star schema at step 630. The data transformation may be performed by ETL server 140 by scripts or other code generated by mapping manager application. The star schema data is then stored at step 640 in data warehouse 145.

A user request for an analytics report may be received at step 650. The request may be received from a user at client 155 by analytics server 150. Analytics may be performed on the star schema data at step 660. The analytics may be tenant and application specific. For example, the analytics may determine the sales for each month of the current year for a particular office. A report is then provided from the analytics results at step 670. The result may include a chart, graph, or other presentation of processed data.

Figure 7:
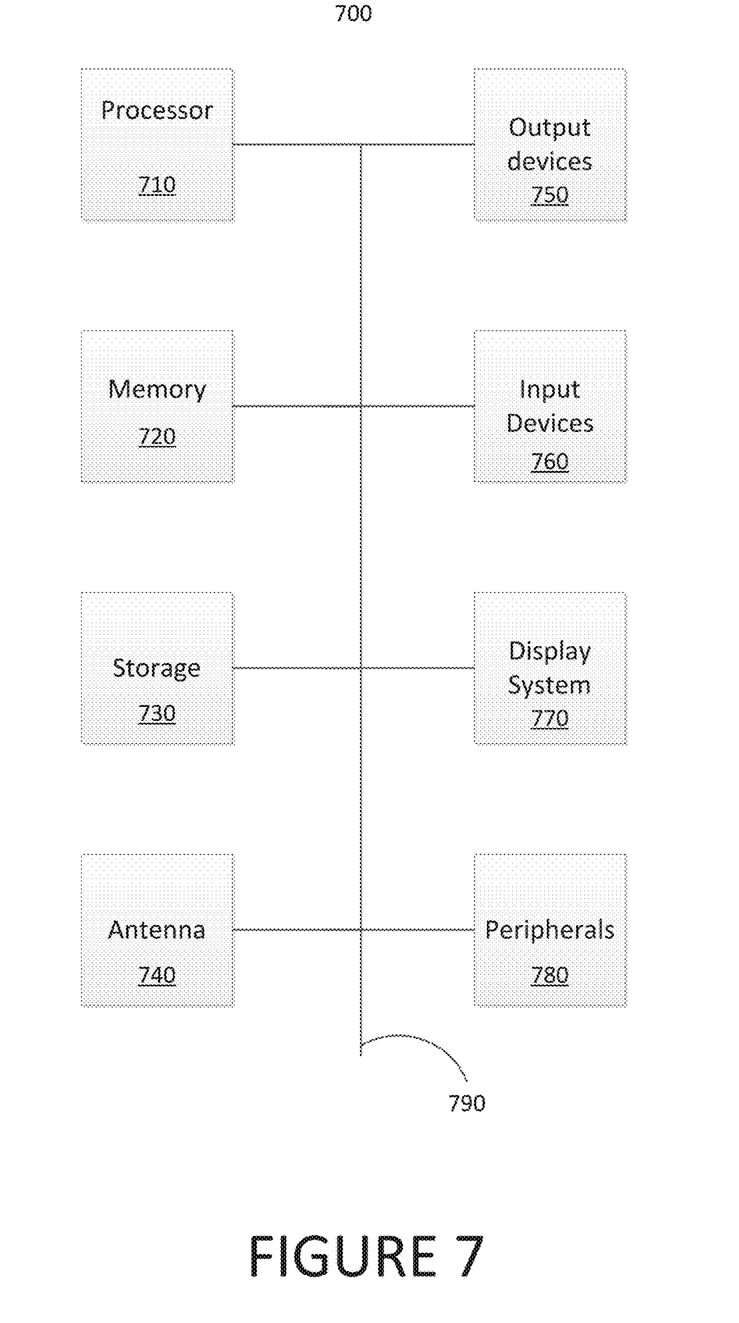
FIG. 7 is a block diagram of a device for implementing the present technology.

FIG. 7 is a block diagram of a device for implementing the present technology. FIG. 7 illustrates an exemplary computing system 700 that may be used to implement a computing device for use with the present technology. System 700 of FIG. 7 may be implemented in the contexts of the likes of servers 110-115, client devices 120 and 155, servers 125, 130, 140 and 150, and databases 135 and 145. The computing system 700 of FIG. 7 includes one or more processors 710 and memory 720. Main memory 720 may store, in part, instructions and data for execution by processor 710. Main memory can store the executable code when in operation. The system 700 of FIG. 7 further includes a storage 730, which may include mass storage and portable storage, antenna 740, output devices 750, user input devices 760, a display system 770, and peripheral devices 780.

The components shown in FIG. 7 are depicted as being connected via a single bus 790. However, the components may be connected through one or more data transport means. For example, processor unit 710 and main memory 720 may be connected via a local microprocessor bus, and the storage 730, peripheral device(s) 780 and display system 770 may be connected via one or more input/output (I/O) buses.

Storage device 730, which may include mass storage implemented with a magnetic disk drive or an optical disk drive, may be a non-volatile storage device for storing data and instructions for use by processor unit 710. Storage device 730 can store the system software for implementing embodiments of the present invention for purposes of loading that software into main memory 710.

Portable storage device of storage 730 operates in conjunction with a portable non-volatile storage medium, such as a floppy disk, compact disk or Digital video disc, to input and output data and code to and from the computer system 700 of FIG. 7. The system software for implementing embodiments of the present invention may be stored on such a portable medium and input to the computer system 700 via the portable storage device.

Antenna 740 may include one or more antennas for communicating wirelessly with another device. Antenna 740 may be used, for example, to communicate wirelessly via Wi-Fi, Bluetooth, with a cellular network, or with other wireless protocols and systems. The one or more antennas may be controlled by a processor 710, which may include a controller, to transmit and receive wireless signals. For example, processor 710 execute programs stored in memory 720 to control antenna 740 transmit a wireless signal to a cellular network and receive a wireless signal from a cellular network.

The system 700 as shown in FIG. 7 includes output devices 750 and input device 760. Examples of suitable output devices include speakers, printers, network interfaces, and monitors. Input devices 760 may include a touch screen, microphone, accelerometers, a camera, and other device. Input devices 760 may include an alpha-numeric keypad, such as a keyboard, for inputting alpha-numeric and other information, or a pointing device, such as a mouse, a trackball, stylus, or cursor direction keys.

Display system 770 may include a liquid crystal display (LCD), LED display, or other suitable display device. Display system 770 receives textual and graphical information, and processes the information for output to the display device.

Peripherals 780 may include any type of computer support device to add additional functionality to the computer system. For example, peripheral device(s) 780 may include a modem or a router.

The components contained in the computer system 700 of FIG. 7 are those typically found in computing system, such as but not limited to a desk top computer, lap top computer, notebook computer, net book computer, tablet computer, smart phone, personal data assistant (PDA), or other computer that may be suitable for use with embodiments of the present invention and are intended to represent a broad category of such computer components that are well known in the art. Thus, the computer system 700 of FIG. 7 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, and other suitable operating systems.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A method for streaming and storing data, comprising:
    automatically generating a context for each application from amongst a plurality of applications that transmitted an initiation message, wherein each context for a particular application is distinct from other context associated with other applications;
    receiving raw streaming data from the one or more applications;
    associating a corresponding context data to a batch of the raw data sent from a particular application, wherein the associating includes:
        creating a batch table, and
        updating the batch table with the context data associated with the batch of raw data sent from the particular application; and
    transmitting the batch of raw data and corresponding associated context data to a remote server, wherein the remote server stores the batch of raw data in memory based on the associated context data without further processing of the raw data.

2. The method of claim 1, further comprising:
    sending a start batch signal to the remote server; and
    receiving the context data from the remote server.

3. The method of claim 1, wherein the batch table includes the context data and a corresponding batch identifier.

4. The method of claim 1, further comprising associating parent-child information to the batch of raw data.

5. The method of claim 4, wherein the transmitted batch of raw data configured to be persisted by the remote server based at least in part on the parent-child information.

6. The method of claim 1, further including partitioning the batch of data into sub-batches.

7. The method of claim 6, wherein the sub-batches are sent in parallel to the remote server.

8. A computer readable non-transitory storage medium having embodied thereon a program, the program being executable by a processor to perform a method for streaming and storing data, the method comprising:
    automatically generating a context for each application from amongst a plurality of applications that transmitted an initiation message, wherein each context for a particular application is distinct from other context associated with other applications;
    receiving raw streaming data from the one or more applications;
    associating a corresponding context data to a batch of the raw data sent from a particular application, wherein the associating includes:

creating a batch table, and
updating the batch table with the context data associated with the batch of raw data sent from the particular application; and transmitting the batch of raw data and corresponding associated context data to a remote server, wherein the remote server stores the batch of raw data in memory based on the associated context data without further processing of the raw data.

9. The computer readable non-transitory storage medium of claim 8, the method further comprising:
sending a start batch signal to the remote server; and
receiving the context data from the remote server.

10. The computer readable non-transitory storage medium of claim 8, wherein the batch table includes the context data and a corresponding batch identifier.

11. The computer readable non-transitory storage medium of claim 8, the method further comprising associating parent-child information to the batch of raw data.

12. The computer readable non-transitory storage medium of claim 11, the transmitted batch of raw data configured to be persisted by the remote server based at least in part on the parent-child information.

13. The computer readable non-transitory storage medium of claim 8, the method further including partitioning the batch of data into sub-batches.

14. The computer readable non-transitory storage medium of claim 13, wherein the sub-batches are sent in parallel to the remote server.

15. A system for streaming and storing data, comprising:
a memory;
a processor; and
one or more modules stored in memory and executable by the processor to:
automatically generate a context for each application from amongst a plurality of applications that transmitted an initiation message, wherein each context for a particular application is distinct from other context associated with other applications;
receive raw streaming data from the one or more applications;
associate a corresponding context data to a batch of the raw data sent from a particular application, wherein the associating includes:
creating a batch table, and
updating the batch table with the context data associated with the batch of raw data sent from the particular application; and
the batch of raw data and corresponding associated context data to a remote server, wherein the remote server stores the batch of raw data in memory based on the associated context data without further processing of the raw data.

16. The system of claim 15, further comprising:
sending a start batch signal to the remote server, and
receiving the context data from the remote server.

17. The system of claim 15, wherein the batch table includes the context data and a corresponding batch identifier.

18. The system of claim 15, the one or more modules further executable to associate parent-child information to the batch of raw data.

19. The system of claim 18, the transmitted batch of raw data configured to be persisted by the remote server based at least in part on the parent-child information.

20. The system of claim 15, the one or more modules further executable to partition the batch of data into sub-batches.

21. The system of claim 20, wherein the sub-batches are sent in parallel to the remote server.

* * * * *